United States Patent
Yasuda et al.

(10) Patent No.: US 11,476,524 B2
(45) Date of Patent: Oct. 18, 2022

(54) PACKAGING MATERIAL FOR BATTERIES

(71) Applicant: DAI NIPPON PRINTING CO., LTD., Tokyo (JP)

(72) Inventors: Daisuke Yasuda, Tokyo (JP); Atsuko Takahagi, Tokyo (JP); Rikiya Yamashita, Tokyo (JP); Shinichiro Nakamura, Tokyo (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 0 days.

(21) Appl. No.: 15/514,637

(22) PCT Filed: Sep. 24, 2015

(86) PCT No.: PCT/JP2015/076902
§ 371 (c)(1),
(2) Date: Mar. 27, 2017

(87) PCT Pub. No.: WO2016/052294
PCT Pub. Date: Apr. 7, 2016

(65) Prior Publication Data
US 2017/0229684 A1    Aug. 10, 2017

(30) Foreign Application Priority Data

Sep. 30, 2014    (JP) .............................. JP2014-202463
Sep. 30, 2014    (JP) .............................. JP2014-202465

(51) Int. Cl.
*H01M 50/124*    (2021.01)
*H01M 50/133*    (2021.01)
(Continued)

(52) U.S. Cl.
CPC ............. *H01M 50/124* (2021.01); *B32B 7/04* (2013.01); *B32B 7/12* (2013.01); *B32B 15/06* (2013.01);
(Continued)

(58) Field of Classification Search
CPC .............................. H01M 2/00; H01M 50/124
See application file for complete search history.

(56) References Cited

U.S. PATENT DOCUMENTS

2002/0142178 A1* 10/2002 Yamashita .......... H01M 2/0275
428/461
2006/0172191 A1    8/2006 Yamashita et al.
(Continued)

FOREIGN PATENT DOCUMENTS

CN    1347573 A    5/2002
EP    2645449 A1    10/2013
(Continued)

OTHER PUBLICATIONS

Phoenix Technologies. (2008). PET Properties 2008. Retrieved from https://www.phoenixtechnologies.net/media/371/PET%20Properties%202008.pdf. (Year: 2008).*
(Continued)

*Primary Examiner* — James Lee
(74) *Attorney, Agent, or Firm* — Oliff PLC (57) ABSTRACT

Provided is a packaging material for batteries, which has excellent insulating properties. A packaging material for batteries, which is formed of a laminate that is obtained by sequentially laminating at least a base layer, a bonding layer, a metal layer and a sealant layer, and wherein the base layer comprises a resin layer A that is formed of a thermoplastic resin having a volume resistivity of $1 \times 10^{15}$ Ω·cm or more.

24 Claims, 3 Drawing Sheets

(51) Int. Cl.

| | |
|---|---|
| H01M 50/183 | (2021.01) |
| B32B 15/20 | (2006.01) |
| H01G 11/78 | (2013.01) |
| B32B 27/30 | (2006.01) |
| B32B 27/32 | (2006.01) |
| B32B 15/06 | (2006.01) |
| B32B 27/36 | (2006.01) |
| B32B 15/098 | (2006.01) |
| B32B 27/38 | (2006.01) |
| B32B 27/34 | (2006.01) |
| B32B 27/40 | (2006.01) |
| B32B 25/16 | (2006.01) |
| B32B 15/082 | (2006.01) |
| B32B 27/28 | (2006.01) |
| B32B 15/095 | (2006.01) |
| B32B 27/42 | (2006.01) |
| B32B 7/04 | (2019.01) |
| B32B 15/085 | (2006.01) |
| B32B 15/092 | (2006.01) |
| B32B 27/18 | (2006.01) |
| B32B 25/08 | (2006.01) |
| B32B 27/08 | (2006.01) |
| H01M 50/116 | (2021.01) |
| B32B 7/12 | (2006.01) |
| B32B 15/088 | (2006.01) |
| B32B 15/09 | (2006.01) |
| H01M 50/131 | (2021.01) |

(52) U.S. Cl.
CPC ......... *B32B 15/082* (2013.01); *B32B 15/085* (2013.01); *B32B 15/088* (2013.01); *B32B 15/09* (2013.01); *B32B 15/092* (2013.01); *B32B 15/095* (2013.01); *B32B 15/098* (2013.01); *B32B 15/20* (2013.01); *B32B 25/08* (2013.01); *B32B 25/16* (2013.01); *B32B 27/08* (2013.01); *B32B 27/18* (2013.01); *B32B 27/28* (2013.01); *B32B 27/283* (2013.01); *B32B 27/302* (2013.01); *B32B 27/308* (2013.01); *B32B 27/32* (2013.01); *B32B 27/322* (2013.01); *B32B 27/325* (2013.01); *B32B 27/34* (2013.01); *B32B 27/36* (2013.01); *B32B 27/38* (2013.01); *B32B 27/40* (2013.01); *B32B 27/42* (2013.01); *H01G 11/78* (2013.01); *H01M 50/116* (2021.01); *H01M 50/183* (2021.01); *B32B 2250/04* (2013.01); *B32B 2250/05* (2013.01); *B32B 2255/06* (2013.01); *B32B 2255/10* (2013.01); *B32B 2255/205* (2013.01); *B32B 2255/26* (2013.01); *B32B 2270/00* (2013.01); *B32B 2274/00* (2013.01); *B32B 2307/20* (2013.01); *B32B 2307/202* (2013.01); *B32B 2307/206* (2013.01); *B32B 2307/31* (2013.01); *B32B 2307/50* (2013.01); *B32B 2307/518* (2013.01); *B32B 2307/584* (2013.01); *B32B 2307/71* (2013.01); *B32B 2307/714* (2013.01); *B32B 2307/7244* (2013.01); *B32B 2307/7246* (2013.01); *B32B 2307/732* (2013.01); *B32B 2307/746* (2013.01); *B32B 2307/752* (2013.01); *B32B 2457/10* (2013.01); *B32B 2553/00* (2013.01); *B32B 2605/00* (2013.01); *H01M 50/1245* (2021.01); *H01M 50/131* (2021.01); *H01M 2220/20* (2013.01); *Y02E 60/13* (2013.01); *Y02T 10/70* (2013.01)

(56) References Cited

U.S. PATENT DOCUMENTS

| | | | |
|---|---|---|---|
| 2008/0182097 A1* | 7/2008 | Mochizuki | B32B 15/08 428/317.3 |
| 2008/0241663 A1 | 10/2008 | Yamashita et al. | |
| 2009/0029245 A1* | 1/2009 | Ibaragi | B32B 15/08 429/176 |
| 2010/0227213 A1 | 9/2010 | Hata | |
| 2012/0034477 A1 | 2/2012 | Yamashita et al. | |
| 2012/0258353 A1 | 10/2012 | Yamashita et al. | |
| 2013/0164606 A1 | 6/2013 | Hata | |
| 2013/0196215 A1* | 8/2013 | Karatsu | H01M 2/0287 429/176 |
| 2013/0260161 A1 | 10/2013 | Nagae et al. | |
| 2014/0234698 A1 | 8/2014 | Taniguchi | |
| 2015/0232611 A1 | 8/2015 | Manabe et al. | |
| 2015/0372263 A1* | 12/2015 | Dou | B32B 15/085 429/176 |
| 2016/0049622 A1 | 2/2016 | Hashimoto et al. | |
| 2018/0123090 A1 | 5/2018 | Yamashita et al. | |

FOREIGN PATENT DOCUMENTS

| | | |
|---|---|---|
| JP | H07-118376 A | 5/1995 |
| JP | H09-219215 A | 8/1997 |
| JP | 2000-123800 A | 4/2000 |
| JP | 2006-66311 A | 3/2006 |
| JP | 2008-130436 A | 6/2008 |
| JP | 2008/277274 A | 11/2008 |
| JP | 2008-288117 A | 11/2008 |
| JP | 2011-216356 A | 10/2011 |
| JP | 2012-146636 A | 8/2012 |
| JP | 2012-172091 A | 9/2012 |
| JP | 2013-101763 A | 5/2013 |
| JP | 2013-201027 A | 10/2013 |
| JP | 2013-214459 A | 10/2013 |
| JP | 2013-222545 A | 10/2013 |
| JP | 2013-225412 A | 10/2013 |
| JP | 2014-22080 A | 2/2014 |
| JP | 2014-157798 A | 8/2014 |
| JP | 2014-186982 A | 10/2014 |
| WO | 2014/069236 A1 | 5/2014 |

OTHER PUBLICATIONS

Hutchins, Marcus. Radtech (2006). Adhesion to Plastic. Retrieved from https://www.radtech.org/proceedings/2006/papers/025.pdf. (Year: 2006).*
Nov. 10, 2015 International Search Report issued in International Patent Application No. PCT/JP2015/076902.
Mar. 13, 2018 Office Action issued in Japanese Patent Application No. 2014-202465.
Jul. 3, 2018 Notification of Information Statement issued in Japanese Patent Application No. 2014-202465.
Minami, Satoyuki et al. "Industrial Plastic Films", Converting Technical Institute, Dec. 22, 1989, pp. 223-225.
"Saturated Polyester Resin Handbook", The Nikkan Kogyo Shimbun, Ltd., Mar. 5, 1991, pp. 337-339.
Jul. 2, 2019 Office Action issued in Chinese Patent Application No. 201580053119.8.
Jun. 21, 2022 Office Action issued in Japanese Patent Application No. 2021-076996.

* cited by examiner

PACKAGING MATERIAL FOR BATTERIES

TECHNICAL FIELD

The present invention relates to a battery packaging material having an excellent insulation quality. The present invention also relates to a battery packaging material in which curling after molding is suppressed.

BACKGROUND ART

Various types of batteries have been developed heretofore, and in every battery, a packaging material is an essential member for sealing battery elements such as an electrode and an electrolyte therein. Metallic packaging materials have been often used heretofore for battery packaging.

On the other hand, in recent years, batteries have been required to be diversified in shape and to be thinned and lightened with improvement of performance of personal computers, cameras, mobile phones and so on. However, metallic battery packaging materials that have often been heretofore used have the disadvantage that it is difficult to keep up with diversification in shape, and there is a limit on weight reduction.

Thus, in recent years, there has been proposed a film-shaped laminate with a base material layer, a metal layer and a sealant layer laminated in this order has been proposed as a battery packaging material which is easily processed into diversified shapes and is capable of achieving thickness reduction and weight reduction. As a base material layer of such a battery packaging material, a polyamide film such as a nylon film is widely used (see, for example, Patent Document 1).

These battery packaging materials have been used mainly in small electric appliances such as mobile phones, smartphones, notebook personal computers and tablet computers heretofore, but in recent years, these battery packaging materials have tended to be used in electromotive bicycles, automobiles, electrical storage devices and so on. Accordingly, batteries for which a battery packaging material is used have been progressively increased in size and capacity, and a plurality of batteries have tended to be modularized (stacked) and used (see, for example, Patent Document 2).

However, a polyamide film that is widely used as a base material layer has a low insulation quality, and therefore when the base material layer is formed from a polyamide film, the insulation quality of modularized high-capacity batteries to be used in automobiles etc. may be deteriorated. For example, when in some of modularized batteries, an insulation quality is deteriorated to cause discharge, adjacent other batteries may be ruptured, leading to impairment of battery functions. Particularly, batteries to be used in automobiles etc. are required to have durability under a severe environment, while a polyamide film has the problem that an insulation quality is more easily deteriorated under a high-humidity environment.

A battery packaging material has been desired to have a further reduced thickness as batteries have been required to have an increased capacity in recent years. For example, when the thickness of a battery packaging material decreases to as thin as 120 μm or less, there is the problem that the insulation quality of the battery packaging material is easily deteriorated.

In such a battery packaging material, generally, a concave portion is formed by cold molding, battery elements such as an electrode and an electrolytic solution are disposed in a space formed by the concave portion, and sealant layers are heat-sealed to obtain a battery with battery elements stored in the battery packaging material.

PRIOR ART DOCUMENTS

Patent Documents

Patent Document 1: Japanese Patent Laid-open Publication No. 2008-288117
Patent Document 2: Japanese Patent Laid-open Publication No. 2013-201027

SUMMARY OF THE INVENTION

Problems to be Solved by the Invention

A main object of a first aspect of the present invention is to provide a battery packaging material including a laminate in which at least a base material layer, an adhesive layer, a metal layer and a sealant layer are laminated in this order, the battery packaging material having an excellent insulation quality even under a high-humidity environment.

In recent years, a battery packaging material has been desired to have a further reduced thickness as batteries have been required to have a reduced size and thickness. However, when the thickness of the battery packaging material decreases, the peripheral edge of a concave portion formed on the battery packaging material is curled (curved), so that storage of a battery element and heat-sealing of a sealant layer may be hindered, leading to deterioration of production efficiency of the battery. Particularly, a battery packaging material to be used in a large secondary battery such as a secondary battery for use in automobiles has the problem that since the battery packaging material has a large size, the impact of curling on productivity of batteries is very large.

Under these circumstances, a main object of a second aspect of the present invention is to provide the following technique: curling after molding is suppressed in a battery packaging material including a laminate in which at least a base material layer, a metal layer and a sealant layer are laminated in this order.

Means for Solving the Problems

The present inventors have extensively conducted studies for achieving the object of the first aspect of the present invention. Resultantly, the present inventors have found that when in a battery packaging material including a laminate in which at least a base material layer, an adhesive layer, a metal layer and a sealant layer are laminated in this order, the base material layer includes a resin layer A formed of a thermoplastic resin having a volume resistivity of $1 \times 10^{15}$ Ω·cm or more, an excellent insulation quality is exhibited. The first aspect of the present invention has been completed by further conducting studies based on the above-mentioned findings.

The present inventors have extensively conducted studies for achieving the object of the second aspect of the present invention. Resultantly, the present inventors have found that when in a battery packaging material including a laminate in which at least a base material layer, a metal layer and a sealant layer are laminated in this order, the thickness of the sealant layer is set to not less than 3 times of the thickness of the base material layer, curling after molding can be effectively suppressed even if the thickness of the battery packaging material decreases to as thin as, for example, 160

µm or less, or even 130 µm or less, or even 100 to 120 µm. The second aspect of the present invention has been completed by further conducting studies based on the above-mentioned findings.

That is, the present invention provides a battery packaging material and a battery of the following aspects.

Item 1. A battery packaging material including a laminate including at least a base material layer, an adhesive layer, a metal layer and a sealant layer laminated in this order, the base material layer including a resin layer A formed of a thermoplastic resin having a volume resistivity of $1×10^{15}$ Ω·cm or more.

Item 2. The battery packaging material according to item 1, wherein a thickness of the resin layer A is in a range of 9 to 25 µm.

Item 3. The battery packaging material according to item 1 or 2, wherein the resin layer A is formed of at least one of polyethylene terephthalate and polybutylene terephthalate.

Item 4. The battery packaging material according to any one of items 1 to 3, wherein a thickness of the laminate is 125 µm or less.

Item 5. A battery packaging material including a laminate including at least a base material layer, a metal layer and a sealant layer laminated in this order,
wherein
a thickness of the sealant layer is not less than 3 times of a thickness of the base material layer.

Item 6. A battery packaging material including a laminate including at least a base material layer, a metal layer, an adhesive layer and a sealant layer laminated in this order,
wherein
a total thickness of the adhesive layer and the sealant layer is not less than 3 times of a thickness of the base material layer.

Item 7. The battery packaging material according to item 5 or 6, wherein a thickness of the laminate is 160 µm or less.

Item 8. The battery packaging material according to any one of items 5 to 7, wherein the base material layer is formed of a stretched resin film, and the sealant layer is formed of an unstretched resin film.

Item 9. The battery packaging material according to any one of items 5 to 8, wherein the base material layer is formed of at least one of a polyamide resin and a polyester resin.

Item 10. The battery packaging material according to any one of items 1 to 9, wherein the metal layer is formed of aluminum foil.

Item 11. The battery packaging material according to any one of items 1 to 10, wherein at least one surface of the metal layer is subjected to a chemical conversion treatment.

Item 12. The battery packaging material according to any one of items 1 to 11, which is a packaging material for a secondary battery.

Item 13. A battery including a battery element including at least a positive electrode, a negative electrode and an electrolyte, the battery element being stored in the battery packaging material according to any one of items 12.

Advantages of the Invention

A battery packaging material according to a first aspect of the present invention includes a laminate including at least a base material layer, an adhesive layer, a metal layer and a sealant layer laminated in this order, and the base material layer includes a resin layer A formed of a thermoplastic resin having a volume resistivity of $1×10^{15}$ Ω·cm or more, so that an excellent insulation quality is exhibited.

A battery packaging material according to a second aspect of the present invention includes a laminate including at least a base material layer, a metal layer and a sealant layer laminated in this order, and by setting the thickness of the sealant layer to not less than 3 times of the thickness of the base material layer, curling after molding can be effectively suppressed. When an adhesive layer is laminated between the metal layer and the sealant layer in the battery packaging material according to the second aspect of the present invention, curling after molding can be effectively suppressed by setting the total thickness of the adhesive layer and the sealant layer to not less than 3 times of the thickness of the base material layer. Further, the battery packaging material according to the second aspect of the present invention can also contribute to improvement of productivity of batteries because curling after molding is suppressed, so that storage of a battery element and heat-sealing of a sealant layer are hardly hindered.

EMBODIMENT OF THE INVENTION

A battery packaging material according to a first aspect of the present invention includes a laminate in which at least a base material layer, an adhesive layer, a metal layer and a sealant layer are laminated in this order, the base material layer including a resin layer A formed of a thermoplastic resin having a volume resistivity of $1×10^{15}$ Ω·cm or more.

A battery packaging material according to a second aspect of the present invention includes a laminate in which at least a base material layer, a metal layer and a sealant layer are laminated in this order, and the thickness of the sealant layer is not less than 3 times of the thickness of the base material layer. Further, when an adhesive layer is laminated between the metal layer and the sealant layer in the battery packaging material according to the second aspect of the present invention, the total thickness of the adhesive layer and the sealant layer is not less than 3 times of the thickness of the base material layer. Hereinafter, the battery packaging materials according to the first and second aspects of the present invention will be described in detail.

1. Laminated Structure of Battery Packaging Material

The battery packaging material includes a laminate in which at least a base material layer 1, an adhesive layer 2, a metal layer 3 and a sealant layer 4 are laminated in this order as shown in FIGS. 1 to 4. In the battery packaging materials according to the first and second aspects of the present invention, the base material layer 1 is an outermost layer, and the sealant layer 4 is an innermost layer. That is, at the time of assembling a battery, the sealant layer 4 situated on the periphery of a battery element is heat-welded with itself to hermetically seal the battery element therein, so that the battery element is encapsulated.

Figure 1:
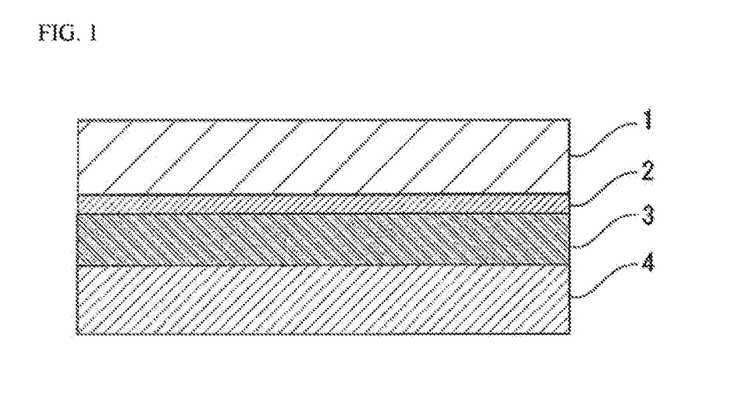
FIG. 1 is a drawing showing one example of a cross-sectional structure of a battery packaging material according to a first aspect of the present invention.
Figure 2:
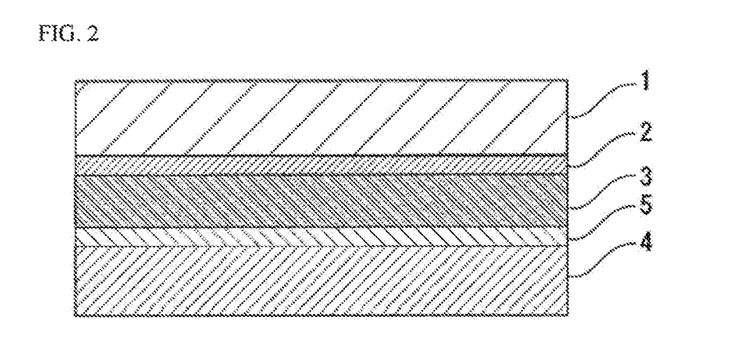
FIG. 2 is a drawing showing one example of a cross-sectional structure of the battery packaging material according to the first aspect of the present invention.
Figure 3:
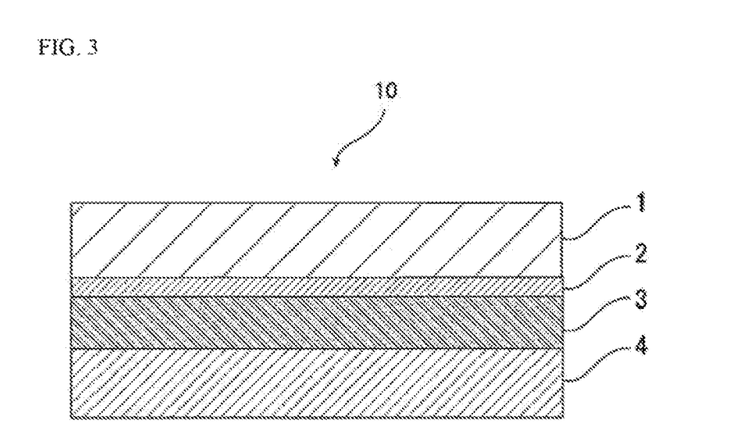
FIG. 3 is a drawing showing one example of a cross-sectional structure of a battery packaging material according to a second aspect of the present invention.
Figure 4:
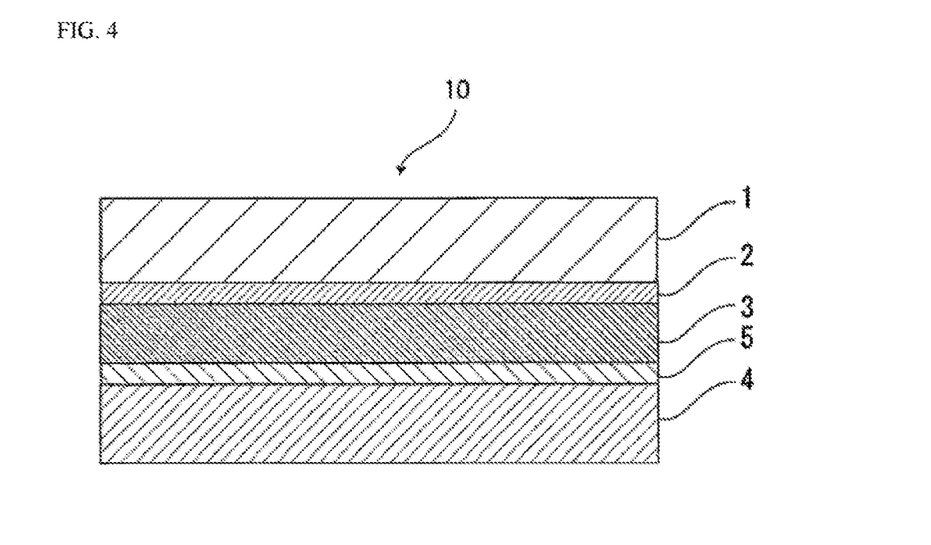
FIG. 4 is a drawing showing one example of a cross-sectional structure of the battery packaging material according to the second aspect of the present invention.

As shown in FIGS. 2 and 4, the battery packaging materials according to the first and second aspects of the present invention may be provided with an adhesive layer 5 between the metal layer 3 and the sealant layer 4 as necessary in order to improve adhesiveness of these layers. A coating layer may also be provided on a surface (surface on a side opposite to the sealant layer 4) of the base material layer 1 although not illustrated.

When the battery packaging material includes the adhesive layer 5 in the second aspect of the present invention, the total thickness of the adhesive layer 5 and the sealant layer 4 may be not less than 3 times of the thickness of the base material layer 1. Therefore, in this case, the thickness of the adhesive layer 5 alone or the sealant layer 4 alone may be not less than 3 times or less than 3 times of the thickness of the base material layer 1.

The thickness of the laminate that forms the battery packaging material according to the first aspect of the present invention is not particularly limited, but it is preferably about 125 μm or less, more preferably about 90 to 120 μm for imparting an excellent insulation quality while thinning the battery packaging material.

2. Relationship of Thickness Among Battery Packaging Material 10, Base Material Layer 1, Adhesive Layer 5 and Sealant Layer 4 in Second Aspect of the Invention In the battery packaging material according to the second aspect of the present invention, the thickness of the later-described sealant layer 4 (total thickness of the adhesive layer 5 and the sealant layer 4) is set to not less than 3 times of the thickness of the later-described base material layer 1. When the thickness of the battery packaging material decreases, the peripheral edge of a concave portion formed on the battery packaging material is curled (curved), so that storage of a battery element and heat-sealing of a sealant layer may be hindered, leading to deterioration of production efficiency of the battery, as described above. On the other hand, in the battery packaging material according to the second aspect of the present invention, the thickness of the sealant layer 4 (total thickness of the adhesive layer 5 and the sealant layer 4) is set to not less than 3 times of the thickness of the base material layer 1 that forms the battery packaging material, and thus curling after molding can be effectively suppressed even if the battery packaging material has a very small thickness of 160 μm or less, or even 130 μm or less, or even 100 to 120 μm.

The detailed mechanism in which curling after molding is effectively suppressed because the thickness of the base material layer 1 and the thickness of the sealant layer 4 (total thickness of the adhesive layer 5 and the sealant layer 4) have a relationship as described above is not all evident, but may be considered as follows, for example. That is, it is considered that when the thickness of the sealant layer 4 (total thickness of the adhesive layer 5 and the sealant layer 4) is set to not less than 3 times of the thickness of the base material layer 1, an impact given to the whole of the battery packaging material by a change in shape of the base material layer 1 during molding is reduced, so that curling (curvature) of the battery packaging material due to a change in shape (shrinkage) of the base material layer 1 on the periphery of a concave portion formed by molding is suppressed.

Particularly, a battery packaging material to be used in a large secondary battery such as a secondary battery for use in automobiles has the problem that since the battery packaging material has a large size, the impact of curling on productivity of batteries is very large. When the battery packaging material according to the second aspect of the present invention is used in large secondary batteries such as secondary batteries for use in automobiles, curling after molding can be effectively suppressed even if the battery packaging material has a very small thickness of, for example, 160 μm or less, or even 130 μm or less, or even 100 to 120 μm.

Even when the battery packaging material according to the second aspect of the present invention is used in batteries other than second batteries for use in automobiles, etc., curling after molding is effectively suppressed even if the laminate that forms the battery packaging material has a small thickness of, for example, 100 μm or less, or even about 90 to 60 μm. Accordingly, even when the thickness is reduced, the battery packaging material according to the second aspect of the present invention can contribute to improvement of the energy density of the battery while suppressing deterioration of productivity of the battery.

Figure 5:
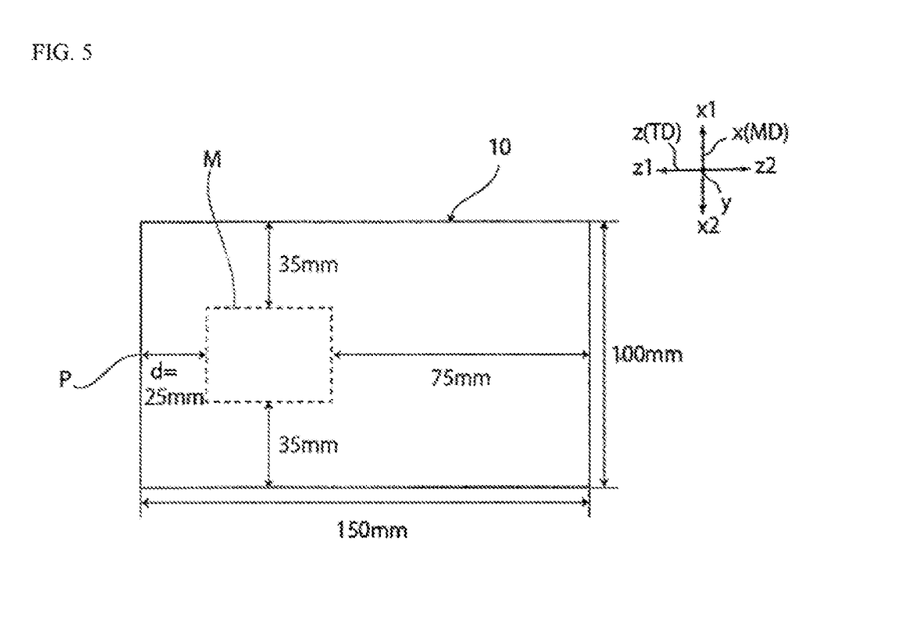
FIG. 5 is a schematic view for explaining a method for evaluation on curling.
Figure 6:
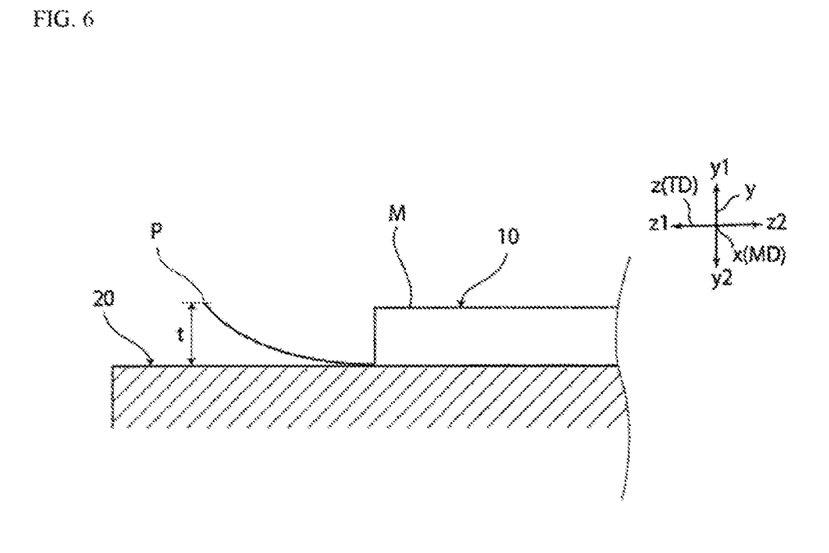
FIG. 6 is a schematic view for explaining a method for evaluation on curling.

In the second aspect of the present invention, evaluation on curling of the battery packaging material after molding can be performed by a method described in examples (see FIGS. 5 and 6).

3. Composition of Each Layer Forming Battery Packaging Material

[Base Material Layer 1]

In the battery packaging material according to the present invention, the base material layer 1 is a layer that forms the outermost layer. In the first aspect of the present invention, the base material layer 1 includes a resin layer A formed of a thermoplastic resin having a volume resistivity of $1 \times 10^{15}$ Ω·cm or more. In the first aspect of the present invention, the base material layer 1 includes a resin layer A formed of a thermoplastic resin having a high volume resistivity as described above, and thus an excellent insulation quality is exhibited even when the battery packaging material has a small thickness (e.g. 120 μm or less), or is placed under a high-humidity environment (e.g. at a temperature of 23° C. and a relative humidity of 90%).

The volume resistivity of the thermoplastic resin that forms the resin layer A is preferably $1 \times 10^{16}$ Ω·cm or more, more preferably $1 \times 10^{17}$ Ω·cm or more for further improving the insulation quality of the battery packaging material according to the first aspect of the present invention. The upper limit value of the volume resistivity of the thermoplastic resin that forms the resin layer A is normally about $1 \times 10^{19}$ Ω·cmΩ·cm. In the first aspect of the present invention, the volume resistivity of the thermoplastic resin that forms the resin layer A is a value measured under the conditions of a temperature of 23° C. and a relative humidity of 50% in accordance with a method conforming to JIS C 2151.

The thermoplastic resin that forms the resin layer A is not particularly limited as long as it has a volume resistivity as described above, and preferred examples thereof include polyolefin resins such as polyethylene and polypropylene; polyester resins such as polyethylene terephthalate, polybutylene terephthalate and polyethylene naphthalate; fluorine-based resins such as ethylene tetrafluoride-propylene hexafluoride copolymers, ethylene tetrafluoride-perfluoroalkoxyethylene copolymers and ethylene tetrafluoride-ethylene copolymers; and polystyrene and styrene-butadiene-acrylonitrile copolymers. Among them, polyethylene terephthalate and polybutylene terephthalate are especially preferred from the viewpoint of an insulation quality, heat resistance and molding processability. The thermoplastic resins that form the resin A may be used alone, or may be used in combination of two or more thereof.

The thickness of the resin layer A is preferably about 9 to 25 µm, more preferably about 12 to 25 µm for exhibiting an excellent insulation quality while suppressing an increase in thickness of the battery packaging material.

The water absorption ratio of the thermoplastic resin that forms the resin layer A is preferably 0.5% or less for exhibiting an excellent insulation quality under a high-humidity environment. The water absorption ratio of the thermoplastic resin is a value obtained by measuring a water absorption ratio at 23° C. after 24 hours in accordance with a method specified in JIS K 7209.

Further, the wet tension of the surface of the resin layer A is preferably 35 mN/m or less for exhibiting an excellent insulation quality under a high-humidity environment. When the wet tension is high, moisture may be easily adsorbed, leading to deterioration of an insulation quality. The wettability of the thermoplastic resin is a value obtained by making a measurement under an atmosphere at 23° C. and 50% RH in accordance with a method specified in JIS K 6768.

The base material layer 1 may be formed of the resin layer A alone, or formed of a plurality of layers including the resin layer A and one other resin layer (formed of a resin having a volume resistivity of less than $1 \times 10^{15}$ Ω·cm). Examples of the resin that forms the other resin layer include resin films of a polyamide resin, an epoxy resin, an acrylic resin, a fluororesin, a polyurethane resin, a silicone resin, a phenol resin and mixtures and copolymers thereof. Among them, a polyamide resin is preferred. Specific examples of the polyamide resin include nylon 6, nylon 6,6, copolymer of nylon 6 and nylon 6,6, nylon 6,10, and polymethaxylyleneadipamide (MXD6), with nylon 6 being preferred. The resins that form the other resin layer may be used alone, or may be used in combination of two or more thereof.

When the base material layer 1 is formed of a plurality of layers including the resin layer A and the other resin layer, these layers may be laminated together with an adhesive component such as an adhesive agent or an adhesive resin interposed therebetween, and the kind, amount and so on of the adhesive component to be used are similar to those for the later-described adhesive layer 2 or adhesive layer 5. The method for laminating a resin film having two or more layers is not particularly limited, and a known method can be employed. Examples thereof include a dry lamination method and a sand lamination method, and a dry lamination method is preferred. When the resin film is laminated by a dry lamination method, it is preferred to use a urethane-based adhesive agent as the adhesive layer. Here, the thickness of the adhesive layer is, for example, about 2 to 5 µm.

Additives such as an antioxidant, a slipping agent, an antiblocking agent and a water repellant may be added to the layer(s) that forms the base material layer 1.

The total thickness of the base material layer 1 is not particularly limited as long as a function as a base material layer is performed, and the total thickness of the base material layer 1 is, for example, about 10 to 50 µm, preferably about 15 to 25 µm.

In the battery packaging material according to the second aspect of the present invention, the base material layer 1 is a layer that forms the outermost layer. The material that forms the base material layer 1 is not particularly limited as long as it has an insulation quality. Examples of the material that forms the base material layer 1 include resins films of a polyester resin, a polyamide resin, an epoxy resin, an acrylic resin, a fluororesin, a polyurethane resin, a silicone resin, a phenol resin and mixtures and copolymers thereof. Among them, a polyester resin and a polyamide resin are preferred, and a biaxially stretched polyester resin and a biaxially stretched polyamide resin are more preferred. Specific examples of the polyester resin include polyethylene terephthalate, polybutylene terephthalate, polyethylene naphthalate, polybutylene naphthalate, copolyester and polycarbonate. Specific examples of the polyamide resin include nylon 6, nylon 6,6, a copolymer of nylon 6 and nylon 6,6, nylon 6,10, and polymethaxylyleneadipamide (MXD6).

The battery packaging material according to the second aspect of the present invention has the problem that when the resin film that forms the base material layer 1 is a stretched resin film and the resin film that forms the later-described sealant layer is an unstretched film, the battery packaging material is easily affected by orientation of the base material layer 1, and easily curled in particular, but in the battery packaging material according to the second aspect of the present invention, the thickness of the base material layer 1 and the thickness of the sealant layer 4 satisfy the above-mentioned relationship, and thus even when the base material layer 1 and the sealant layer 4 are each formed of a resin film as described above, curling during molding can be effectively suppressed. In the second aspect of the present invention, the stretched resin film is one obtained by passing through the step of stretching the resin film at a ratio of about 2 to 5 in at least one of the MD direction and the TD direction during production of the resin film. The unstretched film is one obtained without passing through the above-mentioned step.

In the second aspect of the present invention, the base material layer 1 may be formed of a single layer resin film, or may be formed of a resin film having two or more layers for improving pinhole resistance and an insulation quality. When the base material layer 1 is to be formed of a multilayer resin film, two or more resin films may be laminated together with an adhesive component such as an adhesive agent or an adhesive resin interposed therebetween, and the kind, amount and so on of the adhesive component to be used are similar to those for the later-described adhesive layer 2 or adhesive layer 5. The method for laminating a resin film having two or more layers is not particularly limited, and a known method can be employed. Examples thereof include a dry lamination method and a sand lamination method, and a dry lamination method is preferred. When the resin film is laminated by a dry lamination method, it is preferred to use a urethane-based adhesive agent as the adhesive layer. Here, the thickness of the adhesive layer is, for example, about 2 to 5 µm.

In the second aspect of the present invention, the thickness of the base material layer 1 is not particularly limited as long as the above-mentioned relationship with the thickness of the sealant layer 4 (total thickness of the adhesive layer 5 and the sealant layer 4) is satisfied while a function as a base material layer is performed, and the thickness of the base material layer 1 is, for example, about 10 to 50 µm, preferably about 15 to 25 µm.

[Adhesive Layer 2]

In the battery packaging materials according to the first and second aspects of the present invention, the adhesive layer 2 is a layer provided between the base material layer 1 and the metal layer 3 for strongly bonding these layers to each other.

The adhesive layer 2 is formed from an adhesive agent capable of bonding the base material layer 1 and the metal layer 3. The adhesive agent used for forming the adhesive layer 2 may be a two-liquid curable adhesive agent, or may be a one-liquid curable adhesive agent. Further, the adhesion mechanism of the adhesive agent used for forming the adhesive layer 2 is not particularly limited, and may be any one of a chemical reaction type, a solvent volatilization type, a heat melting type, a heat pressing type and so on.

Specific examples of the adhesive component that can be used for forming the adhesive layer 2 include polyester-based resins such as polyethylene terephthalate, polybutylene terephthalate, polyethylene naphthalate, polybutylene naphthalate, polyethylene isophthalate, polycarbonate and copolyester; polyether-based adhesive agents; polyurethane-based adhesive agents; epoxy-based resins; phenol resin-based resins; polyamide-based resins such as nylon 6, nylon 66, nylon 12 and a copolymerized polyamide; polyolefin-based resins such as a polyolefin, a carboxylic acid-modified polyolefin and a metal-modified polyolefin, and polyvinyl acetate-based resins; cellulose-based adhesive agents; (meth)acryl-based resins; polyimide-based resins; amino resins such as a urea resin and a melamine resin; rubbers such as chloroprene rubber, nitrile rubber and styrene-butadiene rubber; and silicone-based resins. These adhesive components may be used alone, or may be used in combination of two or more thereof. Among these adhesive components, polyurethane-based adhesive agents are preferred.

The thickness of the adhesive layer 2 is not particularly limited as long as a function as an adhesive layer is performed, and the thickness of the adhesive layer 2 is, for example, about 1 to 10 μm, preferably about 2 to 5 μm.

[Metal Layer 3]

In the battery packaging material, the metal layer 3 is a layer that improves the strength of the battery packaging material, and functions as a barrier layer for preventing ingress of water vapor, oxygen, light and the like into the battery. Specific examples of the metal forming the metal layer 3 include aluminum, stainless and titanium, with aluminum being preferred. The metal layer 3 can be formed of metal foil or by metal deposition, and is preferably formed of metal foil, more preferably of aluminum foil. From the view point of preventing generation of wrinkles and pinholes in the metal layer 3 during production of the battery packaging material, it is more preferred to form the metal layer 3 from soft aluminum foil such as annealed aluminum (JIS A8021P-O, JIS A8079P-O).

The aluminum foil to be used as the metal layer 3, the 0.2% yield strength when a tensile test is conducted in a direction parallel to the MD direction and the 0.2% yield strength when a tensile test is conducted in a direction parallel to the TD direction are each preferably in the range of 55 to 140 N/mm$^2$, more preferably in the range of 60 to 100 N/mm$^2$. The 0.2% yield strength is a value measured by a tensile test specified in JIS Z 2241.

While the thickness of the metal layer 3 is not particularly limited as long as a function as a metal layer is performed, it may be, for example, about 10 μm to 50 μm, preferably about 20 μm to 40 μm.

Preferably, at least one surface, preferably both surfaces, of the metal layer 3 are subjected to a chemical conversion treatment for stabilization of bonding, prevention of dissolution and corrosion, and so on. Here, the chemical conversion treatment is a treatment for forming an acid resistance film on the surface of the metal layer. Examples of the chemical conversion treatment include a chromic acid chromate treatment using a chromic acid compound such as chromium nitrate, chromium fluoride, chromium sulfate, chromium acetate, chromium oxalate, chromium biphosphate, acetylacetate chromate, chromium chloride or chromium potassium sulfate; a phosphoric acid chromate treatment using a phosphoric acid compound such as sodium phosphate, potassium phosphate, ammonium phosphate or polyphosphoric acid; and a chromate treatment using an aminated phenol polymer having repeating units represented by the following general formulae (1) to (4). In the aminated phenol polymer, the repeating units represented by the following general formulae (1) to (4) may be contained alone, or may be contained in combination of two or more thereof.

[Chemical Formula 1]

(1)

[Chemical Formula 2]

(2)

[Chemical Formula 3]

(3)

[Chemical Formula 4]

(4)

In the general formulae (1) to (4), X represents a hydrogen atom, a hydroxyl group, an alkyl group, a hydroxyalkyl group, an allyl group or a benzyl group. $R^1$ and $R^2$ are the same or different, and each represent a hydroxyl group, an alkyl group or a hydroxyalkyl group. In the general formulae (1) to (4), examples of the alkyl group represented by X, $R^1$ and $R^2$ include linear or branched alkyl groups with 1 to 4 carbon atoms, such as a methyl group, an ethyl group, a n-propyl group, an isopropyl group, a n-butyl group, an isobutyl group and a tert-butyl group. Examples of the hydroxyalkyl group represented by X, $R^1$ and $R^2$ include linear or branched alkyl groups with 1 to 4 carbon atoms, which is substituted with one hydroxy group, such as a hydroxymethyl group, a 1-hydroxyethyl group, a 2-hydroxyethyl group, a 1-hydroxypropyl group, a 2-hydroxypropyl group, a 3-hydroxypropyl group, a 1-hydroxybutyl group, a 2-hydroxybutyl group, a 3-hydroxybutyl group and a 4-hydroxybutyl group. In the general formulae (1) to (4), the alkyl groups and the hydroxyalkyl groups represented by X, $R^1$ and $R^2$ may be the same or different. In the general formulae (1) to (4), X is preferably a hydrogen atom, a hydroxyl group or a hydroxyalkyl group. A number average molecular weight of the aminated phenol polymer having repeating units represented by the general formulae (1) to (4) is preferably about 500 to 1000000, and more preferably about 1000 to 20000, for example.

Examples of the chemical conversion treatment method for imparting corrosion resistance to the metal layer 3 include a method in which the metal layer 3 is coated with a dispersion of fine particles of a metal oxide such as aluminum oxide, titanium oxide, cerium oxide or tin oxide or barium sulfate in phosphoric acid, and annealed at 150° C. or higher to form a corrosion resistance treatment layer on the surface of the metal layer 3. A resin layer with a cationic polymer crosslinked with a crosslinking agent may be further formed on the corrosion resistance treatment layer. Here, examples of the cationic polymer include polyethyleneimine, ion polymer complexes formed of a polymer having polyethyleneimine and a carboxylic acid, primary amine-grafted acrylic resins obtained by graft-polymerizing a primary amine with an acrylic main backbone, polyallylamine or derivatives thereof, and aminophenol. These cationic polymers may be used alone, or may be used in combination of two or more thereof. Examples of the crosslinking agent include compounds having at least one functional group selected from the group consisting of an isocyanate group, a glycidyl group, a carboxyl group and an oxazoline group, and silane coupling agents. These crosslinking agents may be used alone, or may be used in combination of two or more thereof.

As for the chemical conversion treatment, only one chemical conversion treatment may be conducted, or combination of two or more chemical conversion treatments may be conducted. The chemical conversion treatments may be performed using one compound alone, or may be performed using two or more compounds in combination. Among chemical conversion treatments, a chromic acid chromate treatment, a chromate treatment using a chromic acid compound, a phosphoric acid compound and an aminated phenol polymer in combination, and so on are preferred.

The amount of the acid resistance film to be formed on the surface of the metal layer 3 in the chemical conversion treatment is not particularly limited, but for example, when the above-mentioned chromate treatment is performed, it is desirable that the chromic acid compound be contained in an amount of about 0.5 mg to about 50 mg, preferably about 1.0 mg to about 40 mg, in terms of chromium, the phosphorus compound be contained in an amount of about 0.5 mg to about 50 mg, preferably about 1.0 mg to about 40 mg, in terms of phosphorus, and the aminated phenol polymer be contained in an amount of about 1 mg to about 200 mg, preferably about 5.0 mg to 150 mg, per 1 $m^2$ of the surface of the metal layer 3.

The chemical conversion treatment is performed in the following manner: a solution containing a compound to be used for formation of an acid resistance film is applied onto the surface of the metal layer by a bar coating method, a roll coating method, a gravure coating method, an immersion method or the like, and heating is then performed so that the temperature of the metal layer is about 70° C. to 200° C. The metal layer may be subjected to a degreasing treatment by an alkali immersion method, an electrolytic cleaning method, an acid cleaning method, an electrolytic acid cleaning method or the like before the metal layer is subjected to a chemical conversion treatment. When a degreasing treatment is performed as described above, the chemical conversion treatment of the surface of the metal layer can be further efficiently performed.

[Sealant Layer 4]

In the battery packaging materials according to the first and second aspects of the present invention, the sealant layer 4 corresponds to the innermost layer, and during assembly of a battery, the sealant layers are heat-welded to each other to hermetically seal the battery element therein.

When the later-described adhesive layer 5 is laminated in the battery packaging material according to the second aspect of the present invention, the total thickness of the adhesive layer 5 and the sealant layer 4 may be not less than 3 times of the thickness of the base material layer 1, and the thickness of the sealant layer 4 alone may be not less than 3 times or less than 3 times of the thickness of the base material layer 1. On the other hand, when the later-described adhesive layer 5 is not laminated, the thickness of the sealant layer 4 alone is not less than 3 times of the thickness of the base material layer 1.

In the first and second aspects of the present invention, the resin component to be used in the sealant layer 4 is not particularly limited as long as it can be heat-welded, and examples thereof include polyolefins, cyclic polyolefins, carboxylic acid-modified polyolefins and carboxylic acid-modified cyclic polyolefins.

Specific examples of the polyolefin include polyethylene such as low-density polyethylene, medium-density polyethylene, high-density polyethylene and linear low-density polyethylene; polypropylene such as homopolypropylene, block copolymers of polypropylene (e.g. block copolymers of propylene and ethylene) and random copolymers of polypropylene (e.g. random copolymers of propylene and ethylene); and terpolymers of ethylene-butene-propylene. Among these polyolefins, polyethylene and polypropylene are preferred.

The cyclic polyolefin is a copolymer of an olefin and a cyclic monomer, and examples of the olefin as a constituent monomer of the cyclic polyolefin include ethylene, propylene, 4-methyl-1-pentene, styrene, butadiene and isoprene. Examples of the cyclic monomer as a constituent monomer of the cyclic polyolefin include cyclic alkenes such as norbornene, specifically cyclic dienes such as cyclopentadiene, dicyclopentadiene, cyclohexadiene and norbornadiene. Among these polyolefins, cyclic alkenes are preferred, and norbornene is further preferred.

The carboxylic acid-modified polyolefin is a polymer with the polyolefin modified by subjecting the polyolefin to block polymerization or graft polymerization with a carboxylic acid. Examples of the carboxylic acid to be used for modification include maleic acid, acrylic acid, itaconic acid, crotonic acid, maleic anhydride and itaconic anhydride.

The carboxylic acid-modified cyclic polyolefin is a polymer obtained by performing copolymerization with an α,β-unsaturated carboxylic acid or an anhydride thereof replacing a part of monomers that form the cyclic polyolefin, or by block-polymerizing or graft-polymerizing an α,β-unsaturated carboxylic acid or an anhydride thereof with the cyclic polyolefin. The cyclic polyolefin to be modified with a carboxylic acid is the same as described above. The carboxylic acid to be used for modification is the same as that used for modification of the acid-modified cycloolefin copolymer.

Among these resin components, carboxylic acid-modified polyolefins are preferred, and carboxylic acid-modified polypropylene is further preferred.

The sealant layer 4 may be formed from one resin component alone, or may be formed from a blend polymer obtained by combining two or more resin components. Further, the sealant layer 4 may include only one layer, or two or more layers formed of the same resin component or different resin components.

The thickness of the sealant layer 4 is not particularly limited as long as a function as a sealant layer is performed, and the thickness of the sealant layer 4 is, for example, about 10 to 100 μm, preferably about 15 to 50 μm.

[Adhesive Layer 5]

In the battery packaging materials according to the first and second aspects of the present invention, the adhesive layer 5 is a layer that is provided between the metal layer 3 and the sealant layer 4 as necessary for strongly bonding these layers to each other.

When the adhesive layer 5 is laminated in the battery packaging material according to the second aspect of the present invention, the total thickness of the adhesive layer 5 and the sealant layer 4 may be not less than 3 times of the thickness of the base material layer 1, and the thickness of the adhesive layer 5 alone may be not less than 3 times or less than 3 times of the thickness of the base material layer 1.

The adhesive layer 5 is formed from an adhesive agent capable of bonding the metal layer 3 and the sealant layer 4 to each other. The bonding mechanism, the kind of the adhesive agent component, and so on for the adhesive agent to be used for formation of the adhesive layer 5 are the same as those for the adhesive layer 2. The adhesive agent component to be used in the adhesive layer 5 is preferably a polyolefin-based resin, further preferably a carboxylic acid-modified polyolefin, especially preferably carboxylic acid-modified polypropylene.

The thickness of the adhesive layer 5 is not particularly limited as long as a function as an adhesive layer is performed, and the thickness of the adhesive layer 5 is, for example, about 2 to 50 μm, preferably about 15 to 30 μm.

[Coating Layer]

In the battery packaging materials according to the first and second aspects of the present invention, a coating layer may be provided on the base material layer 1 (on the base material layer 1 on a side opposite to the metal layer 3) as necessary for the purpose of, for example, improving designability, electrolytic solution resistance, scratch resistance and moldability. The coating layer is a layer that is situated at an outermost layer when a battery is assembled.

The coating layer can be formed from, for example, polyvinylidene chloride, a polyester resin, a urethane resin, an acrylic resin, an epoxy resin, or the like. Preferably, the coating layer is formed from a two-liquid curable resin among the resins described above. Examples of the two-liquid curable resin that forms the coating layer include two-liquid curable urethane resins, two-liquid curable polyester resins and two-liquid curable epoxy resins. The coating layer may contain a matting agent.

Examples of the matting agent include fine particles having a particle size of about 0.5 nm to 5 μm. The material of the matting agent is not particularly limited, and examples thereof include metals, metal oxides, inorganic substances and organic substances. The shape of the matting agent is not particularly limited, and examples thereof include a spherical shape, a fibrous shape, a plate shape, an amorphous shape and a balloon shape. Specific examples of the matting agent include talc, silica, graphite, kaolin, montmorilloide, montmorillonite, synthetic mica, hydrotalcite, silica gel, zeolite, aluminum hydroxide, magnesium hydroxide, zinc oxide, magnesium oxide, aluminum oxide, neodymium oxide, antimony oxide, titanium oxide, cerium oxide, calcium sulfate, barium sulfate, calcium carbonate, calcium silicate, lithium carbonate, calcium benzoate, calcium oxalate, magnesium stearate, alumina, carbon black, carbon nanotubes, high-melting-point nylons, crosslinked acrylics, crosslinked styrenes, crosslinked polyethylenes, benzoguanamine, gold, aluminum, copper and nickel. These matting agents may be used alone, or may be used in combination of two or more thereof. Among these matting agents, silica, barium sulfate and titanium oxide are preferred from the viewpoint of dispersion stability, costs and so on. The surface of the matting agent may be subjected to various kinds of surface treatments such as an insulation treatment and a dispersibility enhancing treatment.

The method for forming the coating layer is not particularly limited, and examples thereof include a method in which a two-liquid curable resin for forming the coating layer is applied onto one of the surfaces of the base material layer 1. In the case where a matting agent is blended, the matting agent may be added to and mixed with the two-liquid curable resin, followed by applying the mixture.

While the thickness of the coating layer is not particularly limited as long as a function as a coating layer is performed, it is, for example, about 0.5 to 10 μm, preferably about 1 to 5 μm.

4. Method for Producing Battery Packaging Material

While the method for producing the battery packaging material of each of the first and second aspects of the present invention is not particularly limited as long as a laminate including layers each having predetermined composition is obtained, and for example, the following method is shown as an example.

First, a laminate in which the base material layer 1, the adhesive layer 2 and the metal layer 3 are laminated in this order (hereinafter, the laminate may be described as a "laminate A") is formed. Specifically, the laminate A can be formed by a dry lamination method in which an adhesive agent to be used for formation of the adhesive layer 2 is applied onto the base material layer 1 or the metal layer 3 the surface of which is subjected to a chemical conversion treatment as necessary, using a coating method such as an extrusion method, a gravure coating method or a roll coating method, and dried, the metal layer 3 or the base material layer 1 is then laminated, and the adhesive layer 2 is cured.

Then, the sealant layer 4 is laminated on the metal layer 3 of the laminate A. When the sealant layer 4 is laminated directly on the metal layer 3, a resin component that forms the sealant layer 4 may be applied onto the metal layer 3 of the laminate A by a method such as a gravure coating method or a roll coating method. When the adhesive layer 5 is provided between the metal layer 3 and the sealant layer 4, mentioned is provided, for example, by (1) a method in which the adhesive layer 5 and the sealant layer 4 are co-extruded to be laminated on the metal layer 3 of the laminate A (co-extrusion lamination method); (2) a method in which the adhesive layer 5 and the sealant layer 4 are laminated to form a laminate separately, and the laminate is laminated on the metal layer 3 of the laminate A by a thermal lamination method; (3) a method in which the adhesive layer 5 is laminated on the metal layer 3 of the laminate A by, for example, a method of applying an adhesive agent for formation of the adhesive layer 5 onto the metal layer 3 with an extrusion method or solution coating, and drying and further baking the adhesive agent-applied metal layer 3 at a high temperature, and the sealant layer 4 formed in a sheet-shaped film beforehand is laminated on the adhesive layer 5 by a thermal lamination method; and (4) a method in which the melted adhesive layer 5 is poured between the metal layer 3 of the laminate A and the sealant layer 4 formed in a sheet-shaped film beforehand, and simultaneously the laminate A and the sealant layer 4 are bonded together with the adhesive layer 5 interposed therebetween (sandwich lamination method).

When the coating layer is provided, the coating layer is laminated on a surface of the base material layer 1 on a side opposite to the metal layer 3. The coating layer can be formed by, for example, coating a surface of the base material layer 1 with the resin that forms the coating layer. The order of the step of laminating the metal layer 3 on a surface of the base material layer 1 and the step of laminating the coating layer on a surface of the base material layer 1 is not particularly limited. For example, the coating layer may be formed on a surface of the base material layer 1, followed by forming the metal layer 3 on a surface of the base material layer 1 on a side opposite to the coating layer.

A laminate including the base material layer 1, the adhesive layer 2, the metal layer 3, the surface of which is subjected to a chemical conversion treatment as necessary, the adhesive layer 5 provided as necessary, the sealant layer 4, and the coating layer provided as necessary is formed in the manner described above, and the laminate may be further subjected to a heating treatment of a hot roll contact type, a hot air type, a near- or far-infrared type, or the like for strengthening the adhesion of the adhesive layer 2 and the adhesive layer 5 provided as necessary. As conditions for such a heating treatment, for example, the temperature is 150 to 250° C., and the time is 1 to 5 minutes.

In the battery packaging materials according to the first and second aspects of the present invention, the layers that form the laminate may be subjected to a surface activation treatment such as a corona treatment, a blast treatment, an oxidation treatment or an ozone treatment as necessary for improving or stabilizing film formability, lamination processing and final product secondary processing (pouching and embossing molding) suitability, and the like.

5. Use of Battery Packaging Material

The battery packaging material according to the present invention is used as a packaging material for hermetically sealing therein and storing battery elements such as a positive electrode, a negative electrode and an electrolyte.

Specifically, a battery element including at least a positive electrode, a negative electrode and an electrolyte is covered with the battery packaging material according to the present invention such that a flange portion (region where a sealant layer is in contact with itself) can be formed on the periphery of the battery element while a metal terminal connected to each of the positive electrode and the negative electrode protrudes to the outside, and the sealant layer at the flange portion is heat-sealed with itself, thereby providing a battery hermetically sealed within a battery packaging material. When the battery element is stored in the battery packaging material according to the present invention, the battery packaging material according to the present invention is used such that the sealant portion is on the inner side (surface in contact with the battery element).

The battery packaging material according to the present invention may be used for either a primary battery or a secondary battery, but is preferably used for a secondary battery. The type of the secondary battery to which the battery packaging material according to the present invention is applied is not particularly limited, and examples thereof include lithium ion batteries, lithium ion polymer batteries, lead storage batteries, nickel-hydrogen storage batteries, nickel-cadmium storage batteries, nickel-iron storage batteries, nickel-zinc storage batteries, silver oxide-zinc storage batteries, metal-air batteries, polyvalent cation batteries, condensers and capacitors. Among these secondary batteries, preferred subjects to which the battery packaging material according to the present invention is applied include lithium ion batteries and lithium ion polymer batteries.

EXAMPLES

The present invention will be described in detail below by showing examples and comparative examples. It is to be noted, however, that the present invention is not limited to the examples.

Examples 1A to 6A and Comparative Examples 1A and 2A

<Production of Battery Packaging Material>

A laminate with a base material layer 1, an adhesive layer 2 and a metal layer 3 laminated in this order was prepared using a base material layer, a metal layer and an adhesive layer as shown in each of Examples 1A to 6A and Comparative Examples 1A an 2A below. Specifically, the following adhesive layer 2 was formed on one surface of the base material layer 1, and bonded to a chemically converted surface of the metal layer 3 by pressurization and heating (thermal lamination) to prepare a laminate with the base material layer 1, the adhesive layer 2 and the metal layer 3 laminated in this order. Separately, an acid-modified polypropylene resin (unsaturated carboxylic acid-graft-modified random polypropylene graft-modified with an unsaturated carboxylic acid) for forming the adhesive layer 5 and polypropylene (random copolymer) for forming the sealant layer 4 were co-extruded to prepare a two-layer co-extruded film composed of the adhesive layer 5 and the sealant layer 4. The prepared two-layer co-extruded film was then superimposed on the prepared laminate including the base material layer 1, the adhesive layer 2 and the metal layer 3 in such a manner that the adhesive layer 5 of the two-layer co-extruded film was in contact with the metal layer of the laminate, and thermal lamination was performed by applying heat so that the temperature of the metal layer 3 was 120° C., thereby obtaining a laminate with the base material layer 1, the adhesive layer 2, the metal layer 3, the adhesive layer 5 and the sealant layer 4 laminated in this order. The obtained laminate was temporarily cooled, then heated to 180° C., and held at this temperature for 1 minute to be heat-treated, thereby obtaining a battery packaging material in each of Examples 1A to 6A and Comparative Examples 1A and 2A. The laminated structures of the battery packaging materials obtained in Examples 1A to 6A and Comparative Examples 1A and 2A and the thicknesses of the layers in the battery packaging materials are as follows. The battery packaging materials of Examples 1A to 6A and Comparative Examples 1A and 2A had the same metal layer 3, adhesive layer 2 and sealant layer 4.

Example 1A (Base Material Layer 1)

An unstretched raw film formed of a raw material mainly composed of polyethylene terephthalate was sequentially biaxially stretched by a tenter method, and then heat-treated at 210° C. to produce a PET resin film (thickness: 12 μm). The PET film was produced under the condition of a draw ratio of 3.2 in the machine direction (MD) and 3.2 in the traverse direction (TD).
(Metal Layer 3)

Aluminum foil (ALM1: 8079 material) having the properties shown below was used. The tensile rupture strength and the tensile rupture elongation are each measured by a method conforming to JIS K7127. The 0.2% yield strength is measured by a tensile test specified in JIS Z 2241.

Tensile rupture strength: 86.0 MPa in MD direction and 87.2 MPa in TD direction.

Tensile rupture elongation: 14.3% in MD direction and 12.2% in TD direction.

0.2% Yield strength: 38.6 MPa in MD direction and 37.5 MPa in TD direction.

(Adhesive Layer 2)

For the adhesive layer 2 for bonding the base material layer 1 and the metal layer 3 to each other, the following adhesive agent was used.

A urethane resin-based adhesive agent obtained by mixing in a ratio of 1:3 a polyol compound having a glass transition point of −5 to 5° C., a weight average molecular weight of 10 to 40×10$^3$ and a hydroxyl group equivalent of 0.7 to 1.9/mol and an aromatic isocyanate mainly composed of a trimethylolpropane (TMP) adduct of toluene diisocyanate (TDI)
(Laminated Structure)

PET resin film (12 μm)/adhesive layer (3 μm)/aluminum foil (35 μm)/adhesive layer (30 μm)/sealant layer (30 μm)

Example 2A (Base Material Layer 1)

A laminate was obtained by bonding the PET resin film (12 μm) in Example 1A and the following nylon film to each other with an adhesive agent (thickness: 3 μm) for forming the adhesive layer 2. An unstretched raw film formed of a raw material mainly composed of nylon 6 was simultaneously biaxially stretched by a tubular method, and then heat-treated at 200° C. to produce a nylon film (thickness: 15 μm). The nylon film was produced under the condition of a draw ratio of 3.0 in the machine direction (MD) and 3.3 in the traverse direction (TD).
(Laminated Structure)

PET resin film (12 μm)/adhesive agent (3 μm)/nylon film (15 μm)/adhesive layer (3 μm)/aluminum foil (35 μm)/adhesive layer (30 μm)/sealant layer (30 μm)

Example 3A (Base Material Layer 1)

A PET resin film was prepared in the same manner as in Example 1A except that the PET resin film had a thickness of 9 μm, and a laminate was obtained by bonding the PET resin film and the nylon film (thickness: 15 μm) in Example 2A to each other with an adhesive agent (thickness: 3 μm) for forming the adhesive layer 2.
(Laminated Structure)

PET resin film (9 μm)/adhesive agent (3 μm)/nylon film (15 μm)/adhesive layer (3 μm)/aluminum foil (35 μm)/adhesive layer (30 μm)/sealant layer (30 μm)

Example 4A (Base Material Layer 1)

An unstretched raw film formed of a raw material mainly composed of a resin with 8% by weight of polyethylene terephthalate added to polybutylene terephthalate was simultaneously biaxially stretched by a tubular method, and then heat-treated at 205° C. to produce a PBT resin film. The draw ratio was set to 3.8 in the machine direction (MD) and 3.8 in the traverse direction (TD).
(Laminated Structure)

PBT resin (15 μm)/adhesive layer (3 μm)/aluminum foil (35 μm)/adhesive layer (30 μm)/sealant layer (30 μm)

Example 5A (Base Material Layer 1)

A co-extruded film was prepared by co-extruding a polyethylene terephthalate resin, a thermoplastic polyester-based elastomer and nylon 6 by a T-die method, then biaxially stretched in MD and TD directions by a sequential stretching method, and heat-treated at 200° C. to produce a laminate of PET resin film (thickness: 4 μm)/adhesive agent (thickness: 1 μm)/nylon film (thickness: 20 μm). The draw ratio was set to 3.4 in the machine direction (MD) and 3.8 in the traverse direction (TD). The adhesive agent is the same as one for forming the adhesive layer 2.
(Laminated Structure)

PET resin film (4 μm)/adhesive agent (1 μm)/nylon film (20 μm)/adhesive layer (3 μm)/aluminum foil (35 μm)/adhesive layer (30 μm)/sealant layer (30 μm)

Example 6A (Base Material Layer 1)

A PET resin film prepared in the same manner as in Example 1A except that the PET resin film had a thickness of 6 μm was used alone.
(Laminated Structure)

PET resin film (6 μm)/adhesive layer (3 μm)/aluminum foil (35 μm)/adhesive layer (30 μm)/sealant layer (30 μm)

Comparative Example 1A (Base Material Layer 1)

A nylon film prepared in the same manner as in Example 2A except that the nylon film had a thickness of 25 μm was used alone.
(Laminated Structure)

Nylon film (25 μm)/adhesive layer (3 μm)/aluminum foil (35 μm)/adhesive layer (30 μm)/sealant layer (30 μm)

Comparative Example 2A (Base Material Layer 1)

A nylon film prepared in the same manner as in Example 2A except that the nylon film had a thickness of 15 μm was used alone.
(Laminated Structure)

Nylon film (15 μm)/adhesive layer (3 μm)/aluminum foil (35 μm)/adhesive layer (30 μm)/sealant layer (30 μm)
<Measurement of Volume Resistivity>

In the battery packaging material obtained in each of the examples and the comparative examples, the volume resistivity of a resin for forming the resin layer (formed of a resin having the highest volume resistivity in each base material layer) situated at the outermost layer in the base material layer 1 was measured under the conditions of a temperature of 23° C. and a relative humidity of 50% by a method conforming to JIS C 2151. The results are shown in Table 1A.

<Measurement of Dielectric Breakdown Voltage>

The dielectric breakdown voltage of the battery packaging material obtained in each of the examples and the comparative examples was measured with a voltage applied from the base material layer side, under the conditions of a temperature of 23° C. and a relative humidity of 50% and the conditions of a temperature of 23° C. and a relative humidity of 90%, using a method conforming to JIS C 2110-1 (short-time method). An insulation quality was evaluated in accordance with the following criteria. The results are shown in Table 1A.

⊚⊚: 8 kV or more
⊚: 7 kV or more and less than 8 kV
◯: 6 kV or more and less than 7 kV
Δ: 5 kV or more and less than 6 kV
x: Less than 5 kV <Evaluation by Electrolytic Corrosion Test Method>

For the battery packaging material obtained in each of the examples and the comparative examples, the insulation quality of the base material surface to water was evaluated using an electrolytic corrosion test method. First, each battery packaging material was cut to a size of 80 mm (MD direction, longitudinal direction)×120 mm (TD direction, lateral direction). Next, a molded article provided with a concave having a depth of 6 mm, a length of 50 mm and a width of 35 mm was prepared from each battery packaging material by performing plastic processing using a mold. A molded part as a part of the molded article was soaked with water, the portion soaked with water and a part of the molded article were connected by a copper wire, a voltage of 3 V was applied for 3 days, and whether or not separation (delamination) between the adhesive layer 2 and the metal layer 3 occurred due to liquation of aluminum foil forming the metal layer 3 was determined. The results are shown in Table 1A.

◯: Not delaminated
x: Delaminated

TABLE 1A

| | Volume resistivity of resin forming outermost layer of base material layer [Ω·cm] | Evaluation of insulation quality 23° C. 50% RH | Evaluation of insulation quality 23° C. 90% RH | Evaluation of insulation quality by electrolytic corrosion test method | Laminated structure of base material layer | Total thickness of battery packaging material [μm] |
|---|---|---|---|---|---|---|
| Example 1A | $1 \times 10^{17}$ | ⊚⊚ | ⊚⊚ | ◯ | PET resin film (12 μm) | 110 |
| Example 2A | $1 \times 10^{17}$ | ⊚⊚ | ⊚⊚ | ◯ | PET resin film (12 μm)/adhesive agent (3 μm)/nylon film (15 μm) | 128 |
| Example 3A | $1 \times 10^{17}$ | ⊚ | ⊚ | ◯ | PET resin film (9 μm)/adhesive agent (3 μm)/nylon film (15 μm) | 125 |
| Example 4A | $1 \times 10^{16}$ | ⊚⊚ | ⊚⊚ | ◯ | PBT resin film (15 μm) | 113 |
| Example 5A | $1 \times 10^{17}$ | ◯ | ◯ | ◯ | PET resin film (4 μm)/adhesive agent (1 μm)/nylon film (20 μm) | 123 |
| Example 6A | $1 \times 10^{17}$ | ◯ | ◯ | ◯ | PET resin film (6 μm) | 104 |
| Comparative Example 1A | $1 \times 10^{12}$ | Δ | X | X | Nylon film (25 μm) | 123 |
| Comparative Example 2A | $1 \times 10^{12}$ | X | X | X | Nylon film (15 μm) | 113 |

The results in Table 1A show that the battery packaging materials of Examples 1A to 6A in which the base material layer 1 includes a resin layer formed of a thermoplastic resin having a volume resistivity of $1 \times 10^{15}$ Ω·cm or more have a high dielectric breakdown voltage and an excellent insulation quality. Particularly, the battery packaging materials of Examples 1A to 4A with the resin layer having a thickness of more than 9 μm had an especially high insulation quality. On the other hand, the battery packaging materials of Comparative Examples 1A and 2A in which the base material layer 1 did not include a resin layer formed of a thermoplastic resin having a volume resistivity of $1 \times 10^{15}$ Ω·cm or more had a low insulation quality.

Examples 1B to 3B and Comparative Examples 1B to 8B

<Production of Battery Packaging Material>

A battery packaging material including a laminate with a base material layer 1, an adhesive layer 2, a metal layer 3, an adhesive layer 5 and a sealant layer 4 laminated in this order was produced by laminating the adhesive layer 5 and the sealant layer 4 by a thermal lamination method to a laminate with the base material layer 1, the adhesive layer 2 and the metal layer 3 laminated in this order. Details of conditions for producing the battery packaging material are as shown below.

First, the adhesive layer 2 was formed in a thickness of 3 μm on one surface of the base material layer 1, and bonded to a chemically converted surface of the metal layer 3 by pressurization and heating (thermal lamination) to prepare a laminate with the base material layer 1, the adhesive layer 2 and the metal layer 3 laminated in this order. Separately, an acid-modified polypropylene resin (unsaturated carboxylic acid-graft-modified random polypropylene graft-modified with an unsaturated carboxylic acid) for forming the adhesive layer 5 and polypropylene (random copolymer) for forming the sealant layer 4 were co-extruded to prepare a two-layer co-extruded film composed of the adhesive layer 5 and the sealant layer 4.

The prepared two-layer co-extruded film was then superimposed on the prepared laminate including the base material layer 1, the adhesive layer 2 and the metal layer 3 in such a manner that the adhesive layer 5 of the two-layer co-extruded film was in contact with the metal layer of the laminate, and thermal lamination was performed by applying heat so that the temperature of the metal layer 3 was 120° C., thereby obtaining a laminate with the base material layer 1, the adhesive layer 2, the metal layer 3, the adhesive layer 5 and the sealant layer 4 laminated in this order. The obtained laminate was temporarily cooled, then heated to 180° C., and held at this temperature for 1 minute to be heat-treated, thereby obtaining a battery packaging material in each of Examples 1B to 3B and Comparative Examples 1B to 8B.

The laminated structures of the battery packaging materials prepared in Examples 1B to 3B and Comparative Examples 1B to 8B and the thicknesses of the layers in the battery packaging materials are as follows. A laminate of PET and nylon, which formed the base material layer 1, was obtained by bonding a PET film and a nylon film to each other with an adhesive agent that formed the adhesive layer 2. The thickness of the base material layer 1 does not include the thickness of the adhesive agent.

Example 1B

PET (12 μm)/adhesive agent layer (3 μm)/nylon (15 μm)/adhesive layer 2 (3 μm)/metal layer 3 (40 μm)/adhesive layer 5 (40 μm)/sealant layer 4 (40 μm)

Example 2B

PET (9 μm)/adhesive agent layer (3 μm)/nylon (12 μm)/adhesive layer 2 (3 μm)/metal layer 3 (30 μm)/adhesive layer 5 (35 μm)/sealant layer 4 (35 μm)

Example 3B

PET (12 μm)/adhesive layer 2 (3 μm)/metal layer 3 (35 μm)/adhesive layer 5 (30 μm)/sealant layer 4 (30 μm)

Comparative Example 1B

PET (12 μm)/adhesive agent layer (3 μm)/nylon (15 μm)/adhesive layer 2 (3 μm)/metal layer 3 (40 μm)/adhesive layer 5 (30 μm)/sealant layer 4 (30 μm)

Comparative Example 2B

PET (9 μm)/adhesive agent layer (3 μm)/nylon (12 μm)/adhesive layer 2 (3 μm)/metal layer 3 (30 μm)/adhesive layer 5 (30 μm)/sealant layer 4 (30 μm)

Comparative Example 3B

PET (12 μm)/adhesive agent layer (3 μm)/nylon (15 μm)/adhesive layer 2 (3 μm)/metal layer 3 (35 μm)/adhesive layer 5 (30 μm)/sealant layer 4 (30 μm)

Comparative Example 4B

PET (12 μm)/adhesive agent layer (3 μm)/nylon (15 μm)/adhesive layer 2 (3 μm)/metal layer 3 (35 μm)/adhesive layer 5 (22 μm)/sealant layer 4 (23 μm)

Comparative Example 5B

PET (12 μm)/adhesive agent layer (3 μm)/nylon (12 μm)/adhesive layer 2 (3 μm)/metal layer 3 (35 μm)/adhesive layer 5 (30 μm)/sealant layer 4 (30 μm)

Comparative Example 6B

Nylon (25 μm)/adhesive layer 2 (3 μm)/metal layer 3 (40 μm)/adhesive layer 5 (25 μm)/sealant layer 4 (25 μm)

Comparative Example 7B

Nylon (15 μm)/adhesive layer 2 (3 μm)/metal layer 3 (30 μm)/adhesive layer 5 (20 μm)/sealant layer 4 (15 μm)

Comparative Example 8B

Nylon (15 μm)/adhesive layer 2 (3 μm)/metal layer 3 (30 μm)/adhesive layer 5 (15 μm)/sealant layer 4 (10 μm)

<Evaluation of Curling after Molding>

The battery packaging material obtained as described above was cut to prepare a strip piece of 150×100 mm, and the strip piece was used as a test sample. A straight mold including a rectangular male mold of 30×50 mm, and a female mold with a clearance of 0.5 mm from the male mold was prepared, the test sample was placed on the female mold in such a manner that the sealant layer 4 side was situated on the male mold side, the test sample was pressed at a pressing pressure (surface pressure) of 0.1 MPa in such a manner that the molding depth was 6 mm, and cold molding (draw-in one-step molding) was performed. Details of the position at which molding was performed are as shown in FIG. 5. Molding was performed at a position where the shortest distance d between a rectangular molded part M and an end part P of a battery packaging material 10 was 25 mm as shown in FIG. 5. Next, the battery packaging material 10 after molding was placed on a horizontal surface 20 in a manner as shown in FIG. 6, and the maximum value t of a distance between the horizontal surface 20 and the end part P in a vertical direction y was defined as the maximum height of a curled portion. The evaluation criteria for curling after molding are as described below.

The results are shown in Table 1B.

◯: The value t is 0 mm or more and less than 10 mm, curling is small, and productivity is hardly deteriorated.

x: The value t is 10 mm or more, curling is large, and deterioration of productivity is large.

TABLE 1B

|  | Thickness of base material layer 1 (μm) | Thickness of metal layer 3 (μm) | Total thickness of sealant layer 4/ adhesive layer 5 (μm) | Ratio of thickness of total sealant layer 4 and adhesive layer 5/ thickness of base material layer | Evaluation of curling |
|---|---|---|---|---|---|
| Example 1B | 27 | 40 | 80 | 3.0 | ○ |
| Example 2B | 21 | 30 | 70 | 3.3 | ○ |
| Example 3B | 12 | 35 | 60 | 5.0 | ○ |
| Comparative Example 1B | 27 | 40 | 60 | 2.2 | x |
| Comparative Example 2B | 21 | 30 | 60 | 2.9 | x |
| Comparative Example 3B | 27 | 35 | 60 | 2.2 | x |
| Comparative Example 4B | 27 | 35 | 55 | 2.0 | x |
| Comparative Example 5B | 24 | 35 | 60 | 2.5 | x |
| Comparative Example 6B | 25 | 40 | 50 | 2.0 | x |
| Comparative Example 7B | 15 | 30 | 35 | 2.3 | x |
| Comparative Example 8B | 15 | 30 | 25 | 1.7 | x |

The results in Table 1B show that in the battery packaging materials of Examples 1B to 3B where the total thickness of the adhesive layer 5 and the sealant layer 4 was not less than 3 times of the thickness of the base material layer 1, curling was effectively suppressed even when the battery packaging material was molded under a severe condition, i.e. at a molding depth of 6 mm. On the other hand, the battery packaging materials of Comparative Examples 1B to 8B where the total thickness of the adhesive layer 5 and the sealant layer 4 was less than 3 times of the thickness of the base material layer 1 were significantly curled when molded at a molding depth of 6 mm, and were thus inferior in moldability to the battery packaging materials of Examples 1B to 3B.

DESCRIPTION OF REFERENCE SIGNS

1: Base material layer
2: Adhesive layer
3: Metal layer
4: Sealant layer
5: Adhesive layer
10: Battery packaging material
M: Molded part
P: End part

The invention claimed is:

1. A battery packaging material comprising a laminate including, in this order:
   a base material layer including a polyethylene terephthalate layer having a thickness of 9 to 12 μm,
   an aluminum foil layer having a thickness of 30 to 40 μm, and
   a polypropylene sealant layer directly laminated on the aluminum foil layer and having a thickness of 30 to 40 μm,
   wherein:
   a thickness of the laminate is 153 μm or less,
   a thickness of the sealant layer is not less than 3 times a value equal to a total thickness of the base material layer less a thickness of any adhesive component in the base material layer, and
   the battery packaging material has a curling resistance such that in an evaluation in which the battery packaging material is pressed at a pressing pressure of 0.1 MPa to a molding depth of 6 mm and then cold molded, curling after molding is 0 mm or more and 10 mm or less.

2. The battery packaging material according to claim 1, wherein the base material layer is formed of a stretched resin film, and the sealant layer is formed of an unstretched resin film.

3. A battery comprising a battery element stored in the battery packaging material according to claim 1, the battery element including at least a positive electrode, a negative electrode and an electrolyte, wherein the base material layer is an outermost layer and the sealant layer is an innermost layer.

4. The battery packaging material according to claim 1, wherein at least one surface of the aluminum foil layer is subjected to a chemical conversion treatment.

5. The battery packaging material according to claim 1, wherein the thickness of the sealant layer is not less than 3.3 times the value equal to the total thickness of the base material layer less the thickness of any adhesive component in the base material layer.

6. The battery packaging material according to claim 1, wherein the curling after molding is 0 mm or more and less than 10 mm.

7. The battery packaging material according to claim 1, wherein the sealant layer includes two or more sublayers.

8. The battery packaging material according to claim 1, wherein a thickness of the battery packaging material is 160 μm or less.

9. The battery packaging material according to claim 8, configured to store an automobile battery.

10. A battery comprising a battery element stored in the battery packaging material according to claim 8, the battery element including at least a positive electrode, a negative electrode and an electrolyte, wherein the base material layer is an outermost layer and the sealant layer is an innermost layer.

11. The battery according to claim 10, which is an automobile battery.

12. A battery packaging material comprising a laminate including, in this order:
- a base material layer including (i) a polyethylene terephthalate layer having a thickness of 9 to 12 μm, and optionally (ii) a polyamide layer laminated with an adhesive component, the polyamide layer having a thickness of 12 to 15 μm,
- an aluminum foil layer having a thickness of 30 to 40 μm,
- a carboxylic acid-modified polypropylene layer having a thickness of 30 to 40 μm, and
- a polypropylene sealant layer having a thickness of 30 to 40 μm, wherein:
- a thickness of the laminate is 153 μm or less,
- a total thickness of the carboxylic acid-modified polypropylene layer and the sealant layer is not less than 3 times a value equal to a total thickness of the base material layer less a thickness of any adhesive component in the base material layer, and
- the battery packaging material has a curling resistance such that in an evaluation in which the battery packaging material is pressed at a pressing pressure of 0.1 MPa to a molding depth of 6 mm and then cold molded, curling after molding is 0 mm or more and 10 mm or less.

13. A battery comprising a battery element stored in the battery packaging material according to claim 12, the battery element including at least a positive electrode, a negative electrode and an electrolyte, wherein the base material layer is an outermost layer and the sealant layer is an innermost layer.

14. The battery packaging material according to claim 12, wherein the base material layer is formed of a stretched resin film, and the sealant layer is formed of an unstretched resin film.

15. The battery packaging material according to claim 12, wherein the total thickness of the carboxylic acid-modified polypropylene layer and the sealant layer is not less than 3.3 times the value equal to the total thickness of the base material layer less the thickness of any adhesive component in the base material layer.

16. The battery packaging material according to claim 12, wherein the curling after molding is 0 mm or more and less than 10 mm.

17. The battery packaging material according to claim 12, wherein the thickness of the base material layer is 50 μm or less.

18. The battery packaging material according to claim 12, wherein the sealant layer includes two or more sublayers.

19. The battery packaging material according to claim 12, wherein the carboxylic acid-modified polypropylene layer and the sealant layer are co-extruded.

20. The battery packaging material according to claim 12, wherein a thickness of the battery packaging material is 160 μm or less.

21. The battery packaging material according to claim 20, configured to store an automobile battery.

22. A battery comprising a battery element stored in the battery packaging material according to claim 20, the battery element including at least a positive electrode, a negative electrode and an electrolyte, wherein the base material layer is an outermost layer and the sealant layer is an innermost layer.

23. The battery according to claim 22, which is an automobile battery.

24. The battery packaging material according to claim 19, wherein the sealant layer includes two or more sublayers.

* * * * *